United States Patent
Cui et al.

(10) Patent No.: US 10,411,590 B2
(45) Date of Patent: Sep. 10, 2019

(54) POWER CONSUMPTION REDUCED TYPE POWER CONVERTER

(71) Applicant: Magnachip Semiconductor, Ltd., Cheongju-si (KR)

(72) Inventors: Zhi Yuan Cui, Cheongju-si (KR); In Ho Hwang, Incheon (KR); Young Gi Ryu, Seoul (KR); Tae Young Park, Anyang-si (KR); Sang Hoon Jeong, Seoul (KR)

(73) Assignee: MagnaChip Semiconductor, Ltd., Cheongju-si (KR)

( * ) Notice: Subject to any disclaimer, the term of this patent is extended or adjusted under 35 U.S.C. 154(b) by 0 days.

(21) Appl. No.: 15/082,956

(22) Filed: Mar. 28, 2016

(65) Prior Publication Data

US 2016/0294286 A1 Oct. 6, 2016

(30) Foreign Application Priority Data

Mar. 30, 2015 (KR) .................. 10-2015-0044471

(51) Int. Cl.
*H02M 1/36* (2007.01)
*H02M 3/335* (2006.01)
*H02M 1/00* (2006.01)

(52) U.S. Cl.
CPC .......... *H02M 1/36* (2013.01); *H02M 3/33507* (2013.01); *H02M 2001/0032* (2013.01); *H02M 2001/0035* (2013.01); *Y02B 70/16* (2013.01)

(58) Field of Classification Search
CPC ..... G05F 1/32; G05F 1/12; G05F 1/04; G05F 1/08; G05F 1/46; G05F 1/462; G05F 1/563; G05F 1/565; G05F 1/575; G05F 1/618; G05F 1/62; G05F 1/34; G05F 1/38; G05F 1/24; G05F 1/56; H02M 3/1582; H02M 3/158; H02M 3/155; H02M 3/1588; H02M 3/156; H02M 3/1584; H02M 3/157; H02M 3/33507
(Continued)

(56) References Cited

U.S. PATENT DOCUMENTS 7,710,089 B2 * 5/2010 Kohout ................. H02M 3/157
 323/273
8,488,287 B2 * 7/2013 Ueda ..................... H02H 9/001
 361/86

(Continued)

*Primary Examiner* — Jue Zhang
*Assistant Examiner* — Kevin H Sprenger
(74) *Attorney, Agent, or Firm* — NSIP Law

(57) ABSTRACT

Provided is a power consumption reduction type power converter. For example, such a power converter includes a regulator configured to convert a power voltage into an operation power of a main integrated circuit (IC), a mode detecting pin configured to detect a voltage level of the operation power, wherein the detected voltage level indicates a disable mode or an enable mode, a mode signal output circuit connected to the mode detecting pin, configured to output a mode converting signal, and a switching controller configured to block or connect a power route according to the mode converting signal to supply or block the operation power from being provided to the main IC, wherein the mode detecting pin is connected to a first switch and a first capacitor to perform a charging or a discharging operation of the first capacitor according to a switching operation of the first switch.

15 Claims, 3 Drawing Sheets

(58) Field of Classification Search
USPC ........ 323/259, 265–267, 271–272, 282–285, 323/288
See application file for complete search history.

(56) References Cited

U.S. PATENT DOCUMENTS

| | | | | |
|---|---|---|---|---|
| 9,030,845 | B2* | 5/2015 | Inukai | H02M 1/36 363/21.01 |
| 2006/0209581 | A1* | 9/2006 | Choi | H02M 3/33523 363/120 |
| 2011/0255310 | A1 | 10/2011 | Djenguerian et al. | |
| 2015/0349651 | A1* | 12/2015 | Morota | H02M 3/33523 363/21.15 |

* cited by examiner

POWER CONSUMPTION REDUCED TYPE POWER CONVERTER

CROSS-REFERENCE TO RELATED APPLICATION(S)

This application claims the benefit under 35 USC 119(a) of Korean Patent Application No. 10-2015-0044471 filed on Mar. 30, 2015 in the Korean Intellectual Property Office, the entire disclosure of which is incorporated herein by reference for all purposes.

BACKGROUND

1. Field

The following description relates to a power converter. The following description also relates to a power consumption reduced type power converter that minimizes power consumption regardless of an output terminal overload of the power converter.

2. Description of Related Art

A power converter is a device that converts and provides power for driving various electronic devices such as a computer, a TV, and so on. In some applications, a converter may be a rotary converter, a mercury rectifier and so on. However, recently a power converter refers to a semiconductor power converter formed using a semiconductor device.

A power converter may have a disable mode, that is, a powered down mode or a sleep mode, to reduce its power consumption. The disable mode restricts a part of the operation of the power converter to minimize consumption of a driving current when a main circuit of the power converter does not operate. On the other hand, when the power converter is normally operating, it is referred to as an enable mode or normal mode.

The enable mode and the disable mode in a power converter perform power converter operation according to certain conditions.

Operation of the aforementioned mode converter is illustrated referring to a diagram of a power converter according to an alternative technology shown in the example of FIG. 1. The example of FIG. 1 illustrates a circuit to reduce the energy consumption of a power converter with a structure by which a user is able to restrict the power consumption of the power converter.

First, the following discusses operation with respect to a power converter that enters into a disable mode.

A condition of entering a disable mode is that it occurs when a power level of a feedback block is in a pull-up condition. However, when a voltage level of a feedback block is switched, the operational frequency of a 7-bit counter placed on a back terminal is switched. Accordingly, there is an issue that a mode converting time into a disable mode changes. Alternatively put, an operation is performed in a disable mode. However, when an oscillator of the power converter circuit operates without providing sufficient corrective ability, an operational frequency changes according to a feedback. Accordingly, the time for converting to a disable mode changes so the preferred operational mode is not performed accurately. Thus, an additional oscillator used for a counter in the alternative technology is required. Alternatively put, the power converter of an alternative technology comprises an additional circuit that is able to stably output an operational frequency of a 7-bit counter regardless of a voltage level of a feedback block.

Second, the following discussion illustrates operation of a power converter that enters an enable mode using a bypass capacitor (CBP) included in the power converter.

To enter the enable mode from the disable mode, voltage charged in the bypass capacitor is required to satisfy a condition of being fully discharged.

However, the bypass capacitor of the power converter of an alternatively technology is chosen to be a mass storage capacitor, that is, the capacitor capacitance ranges from about 1 µF to 100 µF. Accordingly, a response time lengthens according to a discharge time for the capacitor. Also, there is a possible issue related to stress being applied to a power switch.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a power consumption reduced type power converter includes a regulator configured to convert a power voltage into an operation power of a main integrated circuit (IC), a mode detecting pin configured to detect a voltage level of the operation power, wherein the detected voltage level indicates a disable mode or an enable mode, a mode signal output circuit connected to the mode detecting pin, configured to output a mode converting signal, and a switching controller configured to block or connect a power route according to the mode converting signal to supply or block the operation power from being provided to the main IC, wherein the mode detecting pin is connected to a first switch and a first capacitor to perform a charging or a discharging operation of the first capacitor according to a switching operation of the first switch.

The first capacitor may have a capacitance of about 1 nF to 100 nF.

The main IC may be set to be in the disable mode during an initial start-up time period.

A voltage level of the mode detecting pin may be a high level in response to the first switch being turned-off and the voltage level of the mode detecting pin may be a low level in response to the first switch being turned-on.

In response to the first switch being turned-off, the first capacitor may be charged and then the main IC may convert to operating in a disable mode, and in response to the first switch being turned-on, the first capacitor may be discharged and then the main IC may convert to operating in an enable mode.

A voltage level of the mode detecting pin may be a low level in response to the first switch being turned-off and the voltage level of the mode detecting pin may be a high level in response to the first switch being turned-on.

The power consumption reduced type power converter may further include a period determining pin is that is connected to the switching controller configured to determine a period for an enable mode operation, during the operation of the disable mode of the main IC.

The period determining pin may be connected to a second capacitor, and may perform an auto enable mode operation every period that is determined according to a capacitance of the second capacitor.

The main IC, during enable mode operation according to the auto enable operation, may operate again in a disable mode in response to the main IC not being required to operate in the enable mode, according to an overload condition.

The main IC may operates in a sourcing mode enabled by charging a voltage of a certain level to the second capacitor that is connected to the period determining pin or in a sinking mode enabled by discharging the voltage charged in the second capacitor.

The main IC may stop the auto enable mode and may operate with a soft start in response to the first switch being is turned-on during an operation of the auto enable mode.

The main IC may stop a soft start and may operate in the auto enable mode in response to the first switch being turned-off during an operation of the soft start.

The mode detecting pin may maintain the mode detecting voltage at a certain level when the main IC operates in an enable mode.

The regulator may be supplied with a high voltage at a high voltage pin of the regulator.

The power consumption reduced type power converter may further include a power switching device arranged between the regulator and the high voltage pin that selectively applies the high voltage to the regulator.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
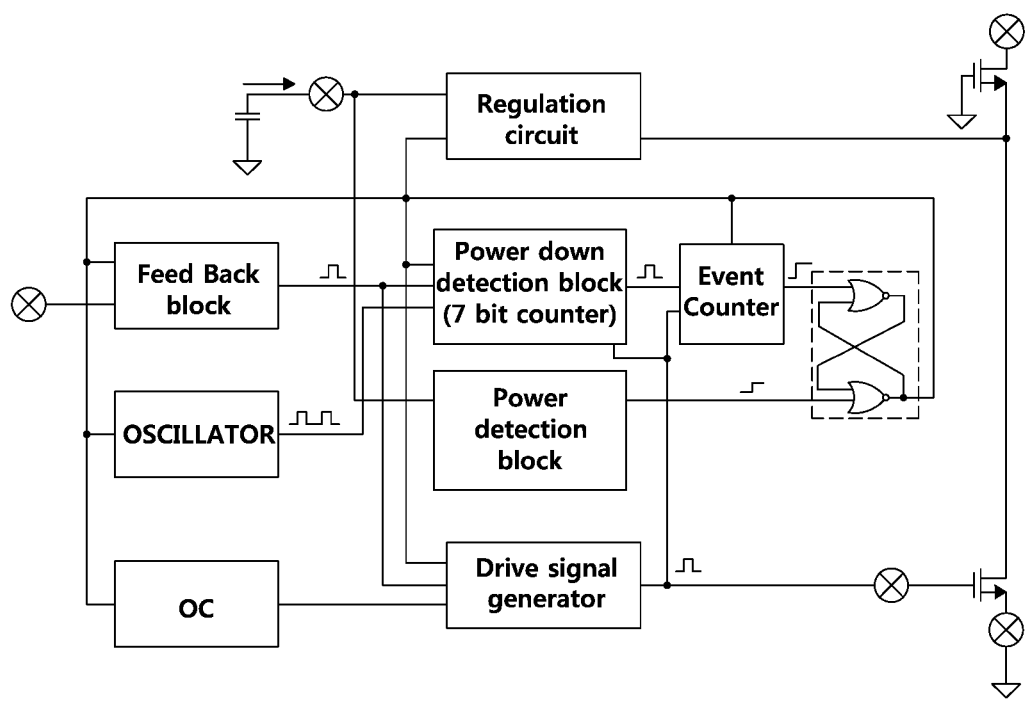
FIG. 1 is a block diagram of a power converter according to an alternative technology.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

According to an embodiment, the embodiment is directed to providing a power consumption type power converter to reduce a time for converting between a disable mode and an enable mode. In other words, power loss is minimized by making a mode conversion speed faster.

Furthermore, according to an embodiment, a period of the disable mode is easily determined.

Also, a power consumption type power converter according to an embodiment has the following additional effects.

In such an embodiment, for example, the present disclosure illustrates a power converter including a mode detecting pin that detects enable mode or disable mode of a main IC and the mode detecting pin is connected to a small storage capacitor for mode converting. For example, a small storage capacitor in such an embodiment uses a capacitor having a capacitance of about 1 nF to 100 nF. Such a capacitor is a capacitor with a smaller capacitance than a bypass capacitor included in a power converter of an alternative technology. Accordingly, using such a smaller capacitor has an effect of having a faster response time due to a reduced charge/discharge time and minimized stress of a switch device for mode selection.

Further, the present embodiments determine a period that is able to automatically perform an enable mode during the disable mode section of the main IC. Accordingly, because an additional switching operation according to a mode conversion is not performed, power consumption generated according to a switching operation is accordingly reduced.

The present embodiments provide stable power to a main IC using a mode detecting pin with a mode conversion function and a small storage capacitor, having a capacitance of about 1 nF to 100 nF, connected to the mode detecting pin and configured to perform mode conversion. Additionally, the present embodiments provide fast mode conversion without requiring switching operation of a switch SW1 connected to the mode detecting pin, according to determination of a disable mode period and an auto enable function.

Furthermore, a power converter of an embodiment is possibly applied to be used as a switching mode power supply (SMPS). Various methods such as a flyback method, a forward method, an LLC method, which may use two inductors and one capacitor method, to perform switch, or a cuk method are applied thereto. However, these are merely examples and other power switching methods are used, as appropriate, in other embodiments.

In further detail, the attached drawings illustrate a power consumption reduced type power converter according to an embodiment.

Figure 2:
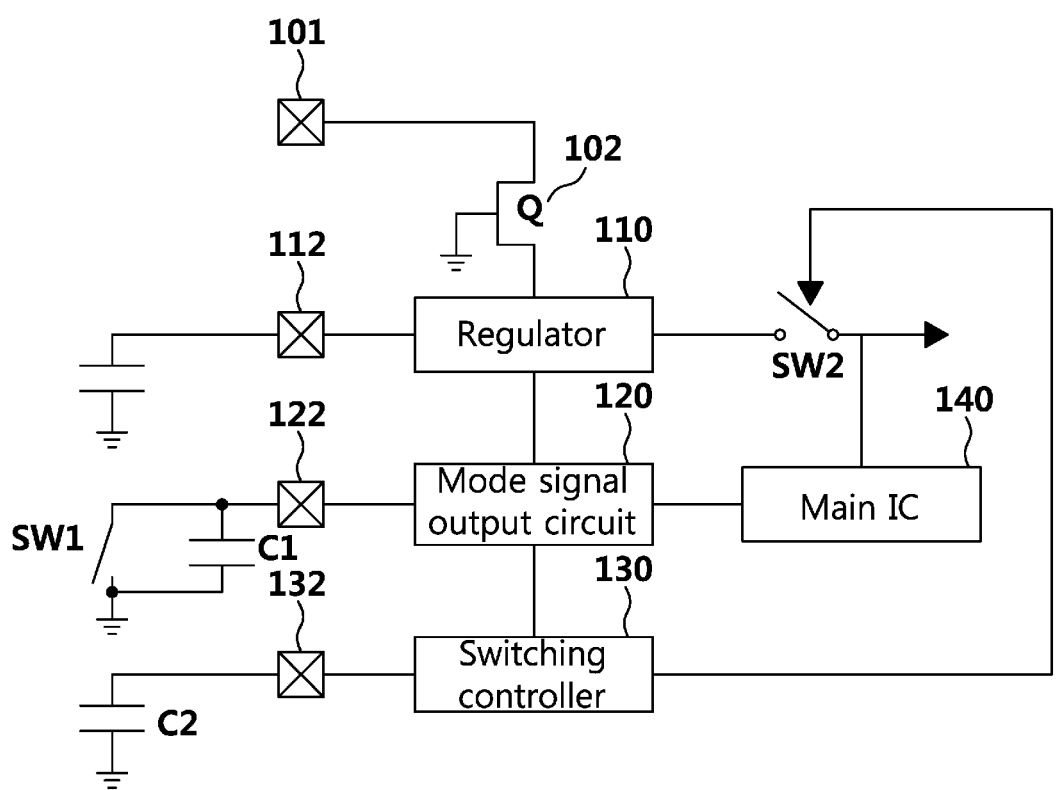
FIG. 2 is a block diagram illustrating a power consumption reduction type power converter according to an embodiment.

FIG. 2 illustrates a block diagram illustrating a power consumption reduced type power converter according to an embodiment.

As illustrated in the embodiment of FIG. 1, the power consumption reduced type power converter, subsequently referred to as a 'power converter,' includes a regulator 110, a mode signal output unit or mode signal output circuit 120, a switching controller 130 and a main IC 140. However, these are only example elements, and the power consumption reduced type power converter optionally includes other components, as appropriate.

The regulator 110 converts a power voltage Vcc to provide an operating power supply that a main IC is able to use to operate. Thus, a power voltage Vcc pin 112 is connected to the regulator 110. The power voltage Vcc supplied at the power voltage Vcc pin 112 is used as the operating power supply of the main IC 140. Optionally, a small storage capacitor is further connected or not connected to the power voltage Vcc pin 112. However, when such a capacitor is connected, the entire circuit is possibly driven more stably because a power voltage Vcc is more stably supplied due to the involvement of the capacitor. Additionally, a high voltage pin 101 is connected to the regulator 110 because a high voltage HV is possibly supplied to the regulator 110 for conversion. For example, the regulator 110 is selectively applied with a high voltage HV due to the operation of a power switching device Q 102 arranged between the regulator 110 and the high voltage pin 101. Here, in various embodiments, the power switching device Q 102 uses a Junction Field Effect Transistor (JFET), a Depletion Metal-Oxide-Semiconductor Field Effect Transistor (MOSFET), a Laterally double-diffused MOSFET, a Double diffused MOSFET and so on. However, other embodiments use different transistors or other alternative power switching devices, as appropriate.

A mode signal output circuit 120 outputs all relevant mode signals. Thus, the mode signal indicates a disable mode signal or an enable mode signal. For this signaling to occur, a mode detecting pin, hereinafter, referred to as a 'DS pin,' is connected to the mode signal output circuit 120. The DIS pin 122 maintains a certain voltage level while the power converter operates in a disable mode and an enable mode.

A first switch SW1 and a first capacitor C1, also referred to as a 'bypass capacitor,' are connected to the DIS pin 122. The first switch SW1 and the first capacitor C1 are disposed in parallel. The first switch SW1 performs a switching operation in order to select the operating mode of the signal, more specifically a disable mode signal or an enable mode signal. Accordingly, the first capacitor C1 is charged or discharged according to a turned-on or turned-off operation of the first switch SW1. Also, the capacitor C1 that is charged or discharged according to the switching operation of the first switch uses a bypass capacitor with a capacitance smaller than that of capacitor used in a power converter of an alternative technology. For example, the capacitance of the bypass capacitor is about 1 nF to 100 nF. The first capacitor C1, having a smaller capacitance is used in this example, and accordingly, a discharge time of the first capacitor C1 is shortened with respect to alternative approaches. Accordingly, a faster response time is possible and stress generated in the first switch SW1 is possibly reduced. On one hand, a voltage level of the DIS pin 122 has a high level or a low level according to the operational status of switch SW1. For example, when the first switch SW1 is turned-off, a voltage level of the DIS pin 122 is a high level or a low level. By contrast, when the first switch SW1 is turned-on, the voltage level of the DIS in 122 is a low level or a high level, such that the voltage level of the DIS in this example is the opposite of the voltage level of the DIS when the first switch SW1 is turned-off.

The mode signal output circuit 120 is connected to the main IC 140 that is configured to control operation of a power converter. The main IC 140 operates the power converter to operate in a disable mode or an enable mode according to a power supply of the regulator 110.

The regulator 110 is connected to a second switch SW2 that controls a power route of the main IC 140. The second switch SW2 is turned-on or turned-off by a switching controller 130. When the second switch SW2 is turned-off, a power supply is blocked to other devices except the mode signal output circuit 120 that is configured to detect mode signals.

Also, the switching controller 130 configured to control switching operation of the second switch SW2 according to the output signal of the mode signal output circuit 120 is included. Alternatively put, the switching controller 130 controls the switching operation of the second switch SW2 according to a mode signal that detects a disable mode or an enable mode for the switch. For example, when operating in the enable mode, if the main IC 140 does not perform any operation, the switching controller 130 turns-off the second switch SW2 to convert operation into a disable mode. Alternatively, according to another embodiment, the second switch SW2 is turned-on.

The switching controller 130 further controls operation of the second switch SW2 according to an auto-enable operation. For this control to occur, a period determining pin, hereinafter, referred to as a 'TIM pin,' and a second capacitor C2 are connected in series to the switching controller 130. The TIM pin 132 performs an automatic enable operation every determined period according to a capacity of the second capacitor C2. Alternatively put, the TIM pin 132 provides an operation period in which the TIM pin 132 operates in an enable mode while the main IC 140 operates in a disable mode. Hereinafter, it is assumed that the main IC 140 operates continuously in an enable mode or in a disable mode according to an overload condition. Likewise, when the auto enable operation is performed, a switching operation of the first switch SW1 for mode converting is possibly excluded, and power consumption is possibly reduced accordingly.

Figure 3:
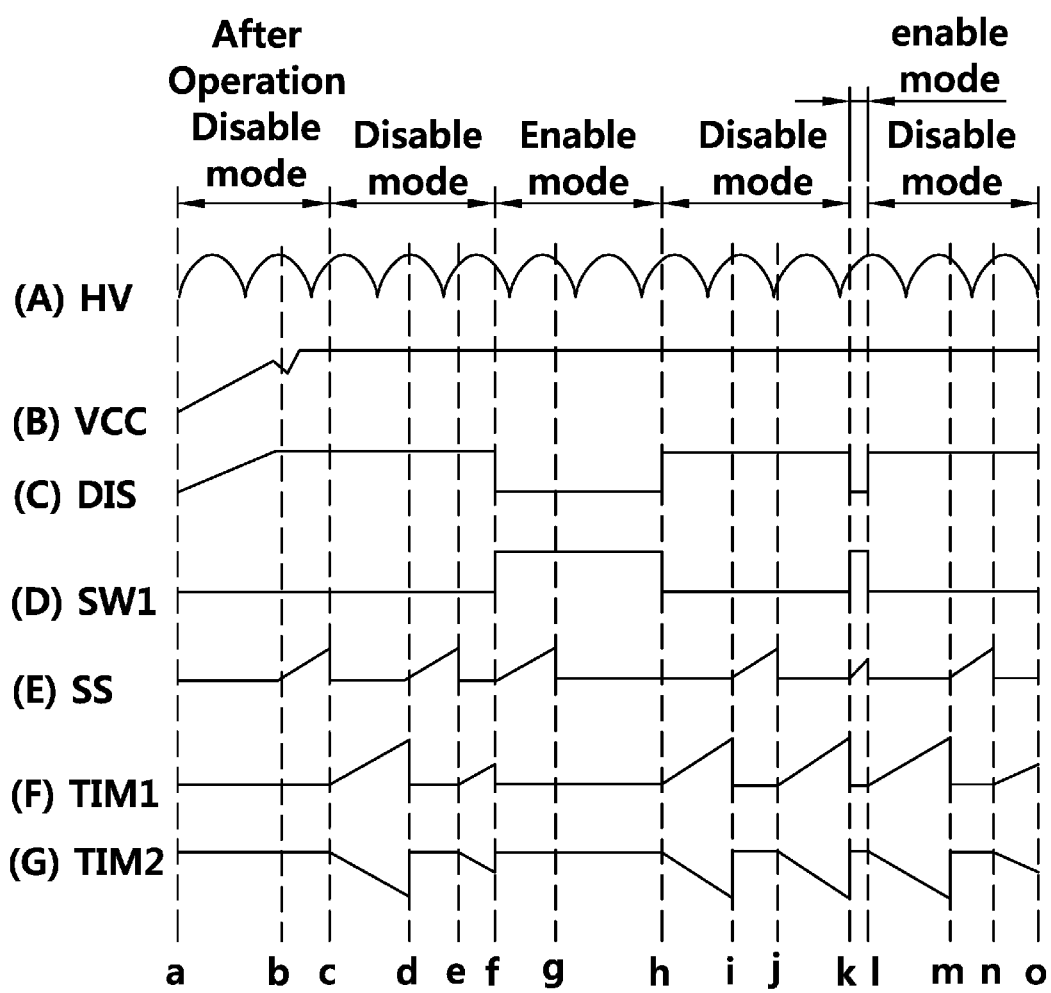
FIG. 3 is a timing chart illustrating an operation status of a power converter according to an embodiment.

FIG. 3 is a timing chart illustrating an operational status of a power converter according to an embodiment.

In FIG. 3, (A) is a high voltage HV level, (B) is a power voltage level, (C) is a voltage level of a DIS pin, (D) is a voltage level of the first switch, (E) is a voltage level of a soft start status, and (F) and (G) are each a voltage level of a TIM pin. Additionally, the TIM pin may operate in accordance with a method of enabling a power converter by charging a voltage, that is, a sourcing type of TIM operation, or with a method of enabling a power converter by discharging the TIM pin voltage, that is, a sinking type of TIM operation. Hence, such voltage levels oppose one another, as shown in (F) and (G).

Subsequently, the aforementioned operation of a power converter with the above features is discussed further, referring to FIG. 3.

For example, an initial status of a power converter includes a second switch SW2 that is turned-off and a main IC 140 having no power supplied to it.

When a power switching device Q 102 is turned-on for an operation of the power converter, a high voltage is supplied in a wave form such as (A) of FIG. 3 through the HV pin 101.

When the high voltage is applied, the regulator 110 starts to be supplied with a power voltage Vcc through the Vcc pin 112. The point in time in FIG. 3 at which power voltage Vcc starts to be applied is when the power converter starts-up, and is indicated by 'a.' In other words, 'a' is a timing point which high voltage is applied. Additionally, the power voltage Vcc gradually increases from 'a' until it reaches a certain level. After a point in time 'c', the regulator 110 maintains a status in order to convert the power voltage Vcc into an operating voltage of the main IC 140. Meanwhile, when the power voltage Vcc is supplied, the first capacitor C1 starts charging. The first capacitor C1 herein has a smaller capacitance, that is, about 1 nF to 100 nF, than a capacity of a bypass capacitor, that is, about 1 µF to 100 µF of a power converter of an alternative technology. Accordingly, charging of the first capacitor C1 is completed, faster than the capacitor of the alternative technology, at a point in time 'b.' Accordingly, when charging is completed, a voltage level of DIS pin 122 is still maintained consistently after the point in time 'b.'

Meanwhile, although the voltage level of the Vcc pin 112 and the DIS pin 122 maintain a certain voltage level, the main IC 140 maintains a disable mode status because the second switch SW2 is turned-off. In other words, the main IC 140 itself continues the disable mode it was in from the initial driving state.

The first switch SW1 is turned-on in the above example. The point in time at which the first switch SW1 turns-on and being operating is 'f.' Until the point in time 'f,' the first switch SW1 is in a turned-off status with a low level value. When the first switch SW1 operates to be turned-on at the point in time 'f', the first switch has a high level value. Subsequently, a charge charged in the first capacitor C1 is discharged, and accordingly a voltage level of the DIS pin 122 is changed from being in a high level status to being in a low level status. Herein, an embodiment illustrates that the power converter includes a DIS pin 122 that takes on a high level status when the first switch SW1 is turned-off and the DIS pin 122 that takes on a low level status when the first switch SW1 is turned-on. By contrast, the power converter according to an embodiment of the present disclosure also possibly includes the DIS pin 122 that takes on a low level status when the first switch SW1 is turned-off, and the DIS pin 122 takes on a high level status when the first switch SW1 is turned-on.

The mode signal output circuit 120 detects a voltage level change of the DIS pin 122. For example, the mode signal output circuit 120 outputs the mode converting signal and the mode converting signal is then applied to the switching controller 130. Then, the switching controller 130 outputs a control signal that turns-on the second switch SW2. Additionally, when the second switch SW2 is turned-on, a power voltage Vcc is supplied to a main IC 140. Subsequently, the main IC 140 converts into an enable mode, accordingly performing a series of operations. In FIG. 3, this enable mode section spans from the point in time 'f' to the point in time 'h.'

Likewise, when converting from a disable mode to an enable mode, the mode converting process is performed according to a voltage level change of the DIS pin 122. As a result, a current possibly is not required to be supplied to other external devices, such as an opto-coupler for mode conversion, as in related technology. Such an opto-coupler refers to a device provided for mode converting of a power converting device of an alternative technology. More specifically, an opto-coupler transfers electrical signals between two isolated circuits by using light, preventing high voltages from affecting the systems that receive the signal.

Additionally, when the first switch SW1 is turned-on during operation of the power converter that operates with a sourcing type in which the TIM pin 132 performs an enable mode by charging voltage or a sinking type in which the TIM pin 132 performs an enable mode by discharging, the main IC 140 operates in an enable mode.

Meanwhile, while the main IC 140 operates in an enable mode, the first switch SW1 operates as being turned-off, which occurs at the point in time 'h.' Then, the first capacitor C1 is charged and a voltage level of the DIS pin 122 changes from a low level to a high level. The mode signal output circuit 120 detects the voltage level change of the DIS pin 122. Accordingly, the switch controller 130 outputs a control signal that turns-off the second switch SW2. When the second switch SW2 is turned-off according to the control signal, the main IC 140 is not supplied with the power voltage Vcc. As a result, the main IC 140 operates in a disable mode again from the point in time 'h'. Thereafter, when the first switch SW1 is not turned-on, the main IC 140 continues to maintain the disable mode.

Likewise, when the mode is converted according to the operation of the first switch SW1, the second switch SW2 is turned-on or turned-off by the main controller 130 and repetitively performs a process of supplying or blocking of power to the main IC 140. Herein, the mode conversion is performed quickly. As mentioned previously, the first capacitor C1, according to an embodiment, reduces charge/discharge time because the capacitance of the first capacitor C1 is smaller than the capacitance of the bypass capacitor used in a power converter of an alternative technology.

According to an embodiment, the power converter automatically performs an enable operation every period that is determined by the second capacitor C2 while the first switch SW1 operates in a disable mode in a turned-off status. This phenomenon is referred to as an 'auto enable operation.' For example, the auto enable operation is performed more often when the predetermined period is shorter, that is, when the capacitance of the second capacitor C2 is smaller.

When a power converter converts into an enable mode according to the auto enable operation, the power converter operates in the enable mode. Then, when the power converter does not have to operate in the enable mode according to an overload condition, the power converter operates again in the disable mode.

Meanwhile, the main IC 140 of the power converter operates with a soft start feature, and the relationship of the power converter with the auto enable operation herein is illustrated further, below.

First, when the main IC 140 operates in an auto enable mode, a soft start signal used to drive the main IC 140 is generated as shown between b and c, d and e of FIG. 3 at (E). However, in such an embodiment, although the soft start signal is generated, the main IC 140 continues to operate in the auto enable mode if the first switch SW1 is turned-off. However, in this embodiment, the first switch SW1 is turned-on, such as at point in time f. Accordingly, an enable signal, such as having a high level status, is applied. Then the main IC 140 stops the auto enable operation and performs a soft start.

By contrast, during the operation of the soft start of the main IC 140 with respect to points in time k and l section of FIG. 3, the first switch SW1 maybe turned-off, such as at point in time l and a disable signal, such as having a low status, is then applied. Then, the main IC 140 stops the soft start operation and performs the auto enable operation again.

An embodiment relates to managing a disable mode from among two modes of a power converter. In a disable mode, power supply is blocked to all blocks of the power converter except for a block for mode detection. Additionally, an auto enable operation is performed for enable mode operation according to period determination and an overloading condition during a disable mode section, thereby reducing power consumption.

The apparatuses, units, modules, devices, and other components illustrated in FIGS. 1-3 that perform the operations described herein with respect to FIGS. 1-3 are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-3. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-3 that perform the operations described herein with respect to FIGS. 1-3 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A power consumption reduced type power converter comprising:
   a regulator configured to convert a power voltage into an operation power of a main integrated circuit (IC);
   a mode detecting pin configured to detect a voltage level, wherein the detected voltage level indicates a disable mode or an enable mode;
   a mode signal output circuit connected to the mode detecting pin, configured to output a mode converting signal;
   a switching controller configured to block or connect a power route of the operation power to the main IC from the regulator according to the mode converting signal;
   a period determining pin that is connected to the switching controller and is configured to determine a period for operating in the enable mode, during operation in the disable mode of the main IC; and
   a power switching device arranged between the regulator and a high voltage pin to provide a high voltage that is converted to the operation power to the regulator,
   wherein a voltage level of the mode detecting pin is determined by a voltage level of a first capacitor, which is in a shorted state or a charged state according to a state of a first switch.

2. The power consumption reduced type power converter of claim 1, wherein the first capacitor has a capacitance of about 1 nF to 100 nF.

3. The power consumption reduced type power converter of claim 1, wherein the main IC is set to be in the disable mode during an initial start-up time period.

4. The power consumption reduced type power converter of claim 1, wherein the voltage level of the mode detecting pin is a high level in response to the first switch being turned-off and the voltage level of the mode detecting pin is a low level in response to the first switch being turned-on.

5. The power consumption reduced type power converter of claim 4, wherein in response to the first switch being turned-off, the first capacitor is charged and then the main IC converts to operating in the disable mode, and in response to the first switch being turned-on, the first capacitor is discharged and then the main IC converts to operating in the enable mode.

6. The power consumption reduced type power converter of claim 1, wherein the voltage level of the mode detecting pin is a low level in response to the first switch being turned-off and the voltage level of the mode detecting pin is a high level in response to the first switch being turned-on.

7. The power consumption reduced type power converter of claim 1, wherein the period determining pin is connected to a second capacitor, and performs an auto enable operation every period that is determined according to a capacitance of the second capacitor.

8. The power consumption reduced type power converter of claim 7, wherein the main IC, during operation in the enable mode according to the auto enable operation, operates again in the disable mode in response to the main IC not being required to operate in the enable mode, according to an overload condition.

9. The power consumption reduced type power converter of claim 7, wherein the main IC operates in a sourcing mode enabled by charging a voltage of a certain level to the second capacitor that is connected to the period determining pin or in a sinking mode enabled by discharging the voltage charged in the second capacitor.

10. The power consumption reduced type power converter of claim 7, wherein the main IC stops the auto enable mode and operates with a soft start in response to the first switch being turned-on during an operation of the auto enable mode.

11. The power consumption reduced type power converter of claim 7, wherein the main IC stops a soft start and operates in the auto enable mode in response to the first switch being turned-off during an operation of the soft start.

12. The power consumption reduced type power converter of claim 1, wherein the mode detecting pin maintains the mode detecting voltage at a certain level when the main IC operates in the enable mode.

13. A power consumption reduced type power converter comprising:
a regulator configured to convert a power voltage into an operation power of a main integrated circuit (IC);
a mode detecting pin configured to detect a voltage level, wherein the detected voltage level indicates a disable mode or an enable mode;
a mode signal output circuit connected to the mode detecting pin, configured to output a mode converting signal;
a switching controller configured to block or connect a power route of the operation power to the main IC from the regulator according to the mode converting signal; and
a power switching device arranged between the regulator and a high voltage pin to provide a high voltage that is converted to the operation power to the regulator,
a period determining pin connected to the switching controller and to a second capacitor, and configured to perform an auto enable operation every period that is determined according to a capacitance of the second capacitor,
wherein a voltage level of the mode detecting pin is determined by a voltage level of a first capacitor, which is in a shorted state or a charged state according to a state of a first switch, and
wherein the main IC, during operation in the enable mode according to the auto enable operation, operates again in the disable mode in response to the main IC not being required to operate in the enable mode, according to an overload condition.

14. A power consumption reduced type power converter comprising:
a regulator configured to convert a power voltage into an operation power of a main integrated circuit (IC);
a mode detecting pin configured to detect a voltage level, wherein the detected voltage level indicates a disable mode or an enable mode;
a mode signal output circuit connected to the mode detecting pin, configured to output a mode converting signal;
a switching controller configured to block or connect a power route of the operation power to the main IC from the regulator according to the mode converting signal; and
a power switching device arranged between the regulator and a high voltage pin to provide a high voltage that is converted to the operation power to the regulator,
a period determining pin connected to the switching controller and a second capacitor, and configured to perform an auto enable operation every period that is determined according to a capacitance of the second capacitor,
wherein a voltage level of the mode detecting pin is determined by a voltage level of a first capacitor, which is in a shorted state or a charged state according to a state of a first switch, and
wherein the main IC stops an auto enable mode and operates with a soft start in response to the first switch being turned-on during an operation of the auto enable mode.

15. A power consumption reduced type power converter comprising:
a regulator configured to convert a power voltage into an operation power of a main integrated circuit (IC);
a mode detecting pin configured to detect a voltage level, wherein the detected voltage level indicates a disable mode or an enable mode;
a mode signal output circuit connected to the mode detecting pin, configured to output a mode converting signal;
a switching controller configured to block or connect a power route of the operation power to the main IC from the regulator according to the mode converting signal; and
a power switching device arranged between the regulator and a high voltage pin to provide a high voltage that is converted to the operation power to the regulator,
a period determining pin connected to the switching controller and to a second capacitor, and configured to perform an auto enable operation every period that is determined according to a capacitance of the second capacitor,
wherein a voltage level of the mode detecting pin is determined by a voltage level of a first capacitor, which is in a shorted state or a charged state according to a state of a first switch, and wherein the main IC stops a soft start and operates in an auto enable mode in response to the first switch being turned-off during an operation of the soft start.

* * * * *